United States Patent Office 3,351,203
Patented Nov. 7, 1967

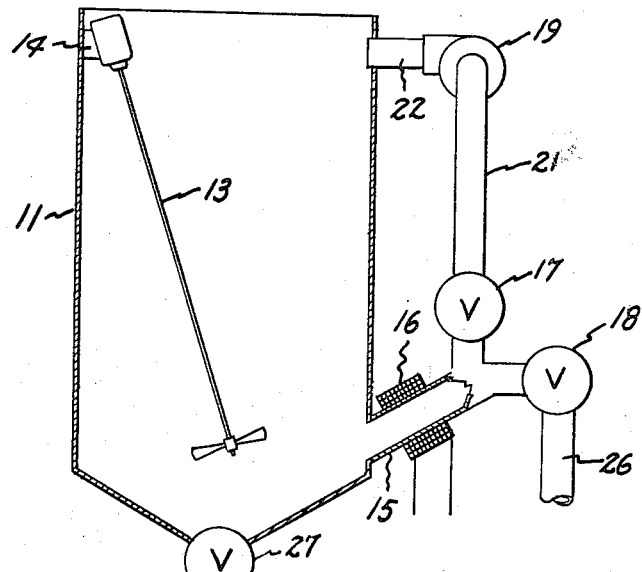
Fig. 1.
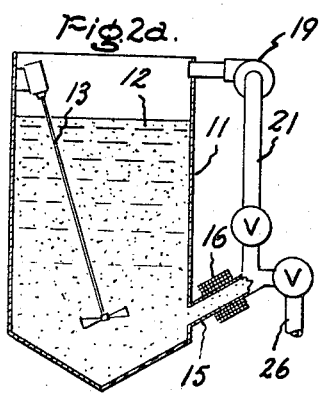
Fig. 2a.
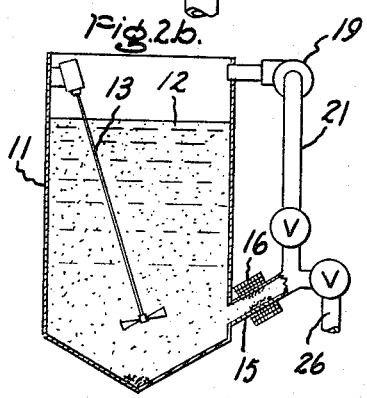
Fig. 2b.
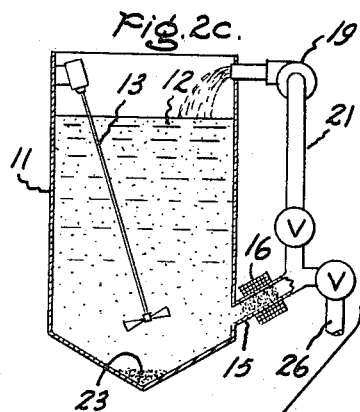
Fig. 2c.
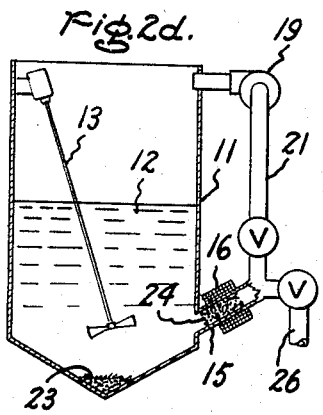
Fig. 2d.
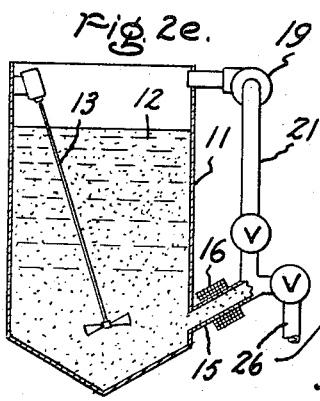
Fig. 2e.
Fig. 2.
Inventor:
Walter L. Robb,
by Leo J. Maloni
His Attorney.

3,351,203
SEPARATION APPARATUS AND METHOD
FOR ITS OPERATION
Walter L. Robb, Scotia, N.Y., assignor to General Electric Company, a corporation of New York
Filed Aug. 17, 1965, Ser. No. 480,286
8 Claims. (Cl. 210—65)

This invention relates to the separation of solid particles from a liquid medium and more particularly to apparatus and a mode of operation thereof for producing a particulate filter that can be selectively formed or dislodged within the apparatus without requiring access to the interior thereof.

Although this invention is broadly applicable in the filtration art, its prime application appears to be to those instances in which effluent from a chemical or biological process contains suspended particulate matter, which should be separated from the effluent and returned to the process for further treatment. One instance of such an application is in the filtration of partially digested sewage. In such a process it is particularly advantageous to remove from the effluent objectionable particulate matter, which generally consists of incompletely digested solids, and return these solids to the digester apparatus.

The filtration of sewage effluent offers a particularly good illustration of the application of this invention and will, therefore, be so employed. However, both the apparatus and the operation thereof disclosed herein may be applied to other processes either as described or with obvious modifications.

It is, therefore, a prime object of this invention to provide a filtration apparatus within which a particulate filter may be formed or dislodged at will without the necessity of gaining access to the interior of the apparatus to conduct these operations.

It is another object of this invention to provide a filtering apparatus having a particulate filter that can be selectively formed or disassembled, such that upon disassembly thereof the particulate granules employed for the filter together with the solid matter entrapped thereby automatically return to the source of the liquid being filtered wherein the particulate granules are cleaned of the solid matter.

It is a further object of this invention to provide a filter apparatus employing ferromagnetic granules or powders, which either can be formed into a compact configuration resembling a sand filter by the application of a magnetic field or, upon release of the magnetic field, may be disassembled and allowed to return to the free-flowing state.

It is a further object of this invention to provide a method of filtering partially digested sewage whereby a particulate filter composed of ferromagnetic granules can be selectively formed and dispersed in order (a) to separate solid matter from the sewage effluent and then (b) to permit the return of filter particles and the solid matter entrapped thereby and thereon to the digester for further digestion of the solid matter and, thereby, simultaneous cleaning of the filter medium.

These and other objects may be attained in the practice of this invention, the apparatus of which comprises in combination a reaction chamber, outlet means connected to and in communication with said reaction chamber, means mounted adjaent said outlet means for selectively creating a magnetic field extending into said outlet means, and selectively operable by-pass circulating means interconnecting said outlet means from downstream of said means for creating a magnetic field with said reaction chamber.

In the operation of the apparatus of this invention the reaction chamber is the site of some chemical reaction involving the dissolution or degeneration of solid material into the liquid state. Liquid will, therefore, be introduced into the reaction chamber (or vessel) either with suspended solid material therein to be subjected to some degenerating reaction or free of solid content for the purpose of dissolving therein solid material also separately introduced to the vessel. A sufficiently large concentration of ferromagnetic particles is introduced into the vessel to form a filter medium spanning the open cross-section of the outlet means and being of the desired thickness and porosity. Agitation of the contents of the vessel will serve both to promote the particular process step and also to urge the ferromagnetic particles into suspension in the liquid to provide ready transport thereof to the magnetic field, when it has been activated. Thereafter, when the particulate filter is to be formed, activation of the means for creating the magnetic field is accomplished, and liquid from the reaction chamber containing the suspended ferromagnetic particles is recirculated into the magnetic field from the vessel, passing therethrough and leaving behind the ferromagnetic particles withdrawn therefrom under the influence of the magnetic field. After the filter has been accumulated in the upwardly-inclined outlet means to the thickness and compaction desired, cessation of the agitation and recirculation follows preparatory to expulsion of the liquid from the vessel through the outlet means and newly-formed particulate filter. When the filtration has been completed, the deactivation of the means for creating the magnetic field is all that is required to bring about the collapse of the filter and the return of the ferromagnetic particles (with solid matter strained from the liquid adhered thereto) back to the vessel due to the incline of the outlet means.

With the above and other objects in view, as will hereinafter become more fully apparent and will be more particularly pointed out in the appended claims, reference is now made to the following description taken in connection with the accompanying drawing in which:

FIG. 1 schematically illustrates a reaction vessel equipped with means for selectively forming and collapsing a particulate filter by means of a magnetic field in accordance with this invention; and FIG. 2 schematically indicates the steps in an operative cycle employing the apparatus of FIG. 1.

The apparatus 10 schematically represented in FIG. 1, although not limited in its application to the digestion of sewage, is easily described in connection with the operative cycle illustrated in FIG. 2. Thus, the reaction vessel 11, which for purposes of this description could be a septic tank in which either aerobic or anaerobic digestion of sewage is allowed to proceed, will (during operation) contain fluid 12. During the process of digestion of the matter contained in fluid 12, agitator 13, which may be mounted on the wall of vessel 11 as by bracket 14, is actuated primarily for the purpose of distributing throughout liquid 12 a concentration of ferromagnetic particles deposited in and retained in vessel 11. There ferromagnetic granules are present to compose on demand the particulate filter to be formed in the manner to be described below. The size of the magnetic particles used depends on the particle size of the solid material to be filtered out. The largest particle size such as will serve to render effective the filtration task at hand is preferred, because the power required to provide a magnetic field of sufficient strength for the purpose will be less. In most cases the particles of magnetic material will be of relatively uniform size, but the use of a variety of sizes may prove beneficial for certain filtering tasks.

After a suitable period of digestion, most of the solid matter will have been decomposed and the liquid 12 will be ready for discharge through the upwardly-inclined outlet conduit 15 made at least, in part of non-magnetic material, for example, glass, plastic and stainless steel. During the continuance of the digestion process, the coil 16 remains in the unenergized condition and the small ferromagnetic filter particles are distributed through liquid 12 by agitator 13 (FIG. 2a). When it is proposed to discharge the digested liquid, coil 16, which is shown girding conduit 15, is energized thereby capturing the ferromagnetic granules within its sphere of influence as an electromagnet to begin the formation of a particulate filter in outlet conduit 15 as shown in FIG. 2b.

In order to complete the formation of the particulate filter to the desired compaction and thickness, valve 17 is opened (valve 18 remaining closed) and pump 19 is energized in order to recirculate fluid from chamber 11 past the electromagnet 16, through pipes 21 and 22 for return to chamber 11. As the fluid is passed through conduit 15, the magnetic field holds back the magnetic particles allowing the liquid to pass on. Depending upon the size of the ferromagnetic particles and the speed with which they will settle out to the bottom of reactor 11, agitator 13 may be continued in operation or stopped. Thus, agitator 13 would remain in operation until the particulate filter has been almost completely formed (FIG. 2c) or until fully formed (FIG. 2d). Surplus magnetic particles and sludge indicated by numeral 23 will settle to the bottom after agitator 13 is stopped, if they are present.

As soon as filter 24 has been formed to the extent desired and fluid between filter 24 and valves 17, 18 has been flushed back into the vessel 11 until clean throughput is obtained, pump 19 is shut off and valve 17 is closed. Now with the drain line downstream of filter 24 cleaned out, valve 18 is opened and the filtration of outgoing fluid 12 proceeds under the pressure head available in reactor 11 or, if desired under additional pressure head as may be supplied by the application of air pressure to the space above fluid 12. As the fluid 12 passes through the filter 24, solid matter, as yet undigested, and other impurities will be held back and separated from the outgoing fluid, which then exits via conduit 26, the filtering action being much like the action received with a sand filter. The clear effluent from conduit 26 is then handled in some appropriate manner for distribution or disposition.

After emptying fluid 12 from reactor 11 to the extent desired (or possible, in the event auxiliary pressure is unavailable), valve 18 is closed. The level of fluid in reactor 11 is raised once more (FIG. 2e) by the addition of more sewage to be digested and electromagnet coil 16 is de-energized thereby allowing the ferromagnetic filter particles, which will have been coated with and will have trapped flocculent material separated from the effluent, to separate, slide down outlet conduit 15 and fall back into vessel 11. As before, agitator 13 will then be operated to effect dispersal of these particles in liquid 12. Thereafter, digestion proceeds in the manner earlier described with the material collected on the filter particles being exposed for at least a second time to the digestion process. The cycle can, of course, be repeated as often as necessary.

Although an electromagnetic coil has been shown by way of illustration, it is possible to employ in place thereof a set of movable permanent magnets, mounted such that, when it is desired to form the filter, these magnets can be moved closed to outlet 15, and, when the filter is to be dispersed from the conglomerate position, the permanent magnets can be moved to a retracted position.

Provision may be made for periodically dumping such sludge as will not digest and which collects on the bottom of vessel 11. Whenever such periodic cleaning of vessel 11 is proposed, the operation of both agitator 13 and pump 19 are continued with coil 16 energized to recirculate the liquid 12 long enough to deposit all, or substantially all, of the ferromagnetic particles at the filtering position. Then, after filtration of the liquid 12, these particles will be positively held by the activated coil 16 as the balance of the unfiltered liquid 12 and accumulated sludge are dumped via valve 27 without substantial loss of the ferromagntic material. Liquid decanted from the discarded material can be decanted and returned to vessel 11. After the cleaning operation, valve 27 is closed; coil 16 de-energized and particles 23 allowed to slide back down conduit 15 to the interior of vessel 11 preparatory to continuation of the digestion-filtering operations.

As an indication of the effectiveness of this filtering apparatus, tests were conducted using magnetite particles having a size less than 100 mesh. A colloidal suspension of carbon black in water was placed in vessel 11 and filtered in the manner described hereinabove. The filtered effluent emerging through the magnetite filter was crystal clear with a throughput of approximately 300 cc./min. with a head of several inches of water through a $3/8''$ diameter outlet pipe. Approximately 1 ampere of D.C. current at 5 volts was sufficient to firmly position a particulate filter of the magnetite $1/2''$ long and $3/8''$ in diameter.

Magnetite ore is an ideal source of ferromagnetic particles for the conduct of the process of this invention because it is inexpensive, is easily crushed and has been found to yield excellent agglomeration of the filter by the magnetic field an infinite number of times. Many other materials besides magnetite can be used to form this filter, however, and such materials are easily selected depending upon the particular digestion or dissolution process being conducted in vessel 11.

It is to be understood, of course, that conduit 21 may be made extensible, or flexible, so that outlet means 15 may be pivotally connected to the shell of vessel 11 nearer the bottom end thereof. By this expedient the outlet means 15 (and coil 16 therewith) may be inclined downwardly away from vessel 11 during the steps of (a) forming the filter 24 and (b) filtering and then may be raised to incline upwardly as shown in the drawing to facilitate automatic return of the magnetic particles upon deactivation of coil 16. Also, in the case of requiring a very large outlet means to accommodate high capacity filtration, the electromagnet and the portion of outlet means 15 in juxtaposition therewith may be constructed so that for at least this portion of is length the oulet means is subdivided into a plurality of passages each provided with its electromagnetic coil. This optional construction will insure maximum strength of magnetic field over the open area of the outlet passage.

By varying the amount of ferromagnetic material introduced into the vessel and by varying the period of recirculation of the liquid containing the suspended ferromagnetic particles, the particulate filter may be built up to the desired density and thickness to achieve varying degrees of completeness of filtration. The selective formation and dispersal of the ferromagnetic particles is controlled in a simple manner with the assurance that solid matter separated from the effluent will be returned for further exposure in the reaction chamber 11. Also, because the magnetic particles in the particulate filter as formed are firmly held in place, the throughput of liquid being filtered can be maintained at a high level simply by employing a strong magnetic field. Thus, there is no need for screen supports as is required with sand filters.

In addition to its use in connection with the digestion of sewage and the filtration of the digested sewage, this invention is of particular utility in the dissolving or digesting of any slow digesting material, as for example various ores or plastic materials. To save process time and equipment volume it is of advantage to introduce an excess of the solid, for example a polymer, into the solvent in the reaction vessel. In the case of a polymer to be dissolved heat would be applied to the reaction vessel and after heating and agitation has brought the concentration of dissolved polymer to the desired point, the filtration could proceed as described herein and the excess of solid polymer retained in the reaction vessel for continuation of the dissolution process.

A very similar construction, which is not illustrated, but has been successfully demonstrated, is one wherein a portion of the wall (or sloping floor) of vessel 11 is made of non-magnetic material with at least a portion thereof perforated, or covered by a perforated member, i.e. stainless steel or copper screen, fiberglass or Dacron cloth. The outlet pipe would connect to the wall of vessel 11 around the perforated member to receive flow therefrom. The means for selectively creating the magnetic field may be located around the perforated section either immediately inside the vessel or next to the outside of the vessel wall. Together with this construction a recirculating arrangement similar to that shown connected to the outlet pipe in the drawing is employed to facilitate formation of the filter of magnetic particles. With this arrangement the filter will form clustered over and around the perforated wall area with substantially all the magnetic particles remaining in the vessel 11. Thus, upon the removal of the magnetic field the magnetic particles will be properly situated for convenient dispersal. This arrangement has the added advantage that there is no longer a requirement that the outlet pipe be inclined upwardly away from vessel 11.

It should be understood, of course, that the foregoing disclosure relates to only a preferred embodiment of the invention and that numerous modifications or alterations may be made therein without departing from the spirit and scope of the invention as set forth in the appended claims.

What I claim as new and desire to secure by Letters Patent of the United States is:

1. Process apparatus comprising in combination:
   (a) a vessel,
   (b) outlet means in flow communication with said vessel,
      (1) said outlet means being composed of electrically non-conducting material at least in part,
   (c) means for selectively inducing a magnetic field in a volume located in the path of flow communication from said vessel to said outlet means,
   (d) means for selectively conducting liquid from said outlet means and returning the liquid to said vessel,
      (1) said means for conducting liquid from and returning the liquid to said vessel being connected to said outlet means further away from said vessel than the location of said means for inducing a magnetic field.

2. The process apparatus substantially as recited in claim 1 wherein the outlet means is upwardly-inclined away from said vessel.

3. The process apparatus substantially as recited in claim 2 wherein the vessel contains liquid and ferromagnetic particles.

4. The process apparatus substantially as recited in claim 3 wherein there is an agitating means mounted in the vessel to distribute the particles through the liquid.

5. In a process for filtering liquid to be discharged from a reaction vessel the steps comprising:
   (a) distributing a substantial quantity of particles of ferromagnetic material through the liquid in the reaction vessel,
   (b) establishing a magnetic field in an outlet from said vessel,
   (c) conducting liquid containing suspended magnetic particles from the interior of said vessel out said outlet and through the magnetic field, whereby the magnetic particles are held in the magnetic field,
   (d) returning the liquid so freed of magnetic particles to said vessel,
   (e) continuing the conduct and return of liquid until a sufficiently thick and dense concentration of magnetic particles has been formed to span the open area of said outlet forming a particulate filter and the returning liquid is cleaned, and
   (f) discontinuing the returning of the liquid and allowing the liquid to pass on after passage through the magnetic particle filter.

6. The process for filtering substantially as recited in claim 5 wherein upon collapse of the magnetic field the magnetic particles automatically return to the vessel.

7. Process apparatus comprising in combination:
   (a) a vessel,
   (b) outlet means in flow communication with said vessel,
   (c) means for selectively inducing a magnetic field in a volume located in the path of flow communication from said vessel via said outlet means,
   (d) means for selectively conducting liquid from said outlet means and returning the liquid to said vessel,
      (1) said means for conducting liquid from and returning the liquid to said vessel being connected to said outlet means further away from said vessel than the location of said means for inducing a magnetic field.

8. The process apparatus substantially as recited in claim 7 wherein the vessel contains liquid and ferromagnetic particles.

References Cited

UNITED STATES PATENTS

| | | | |
|---|---|---|---|
| 1,872,759 | 8/1932 | Laughlin et al. | 210—416 X |
| 2,398,725 | 4/1946 | Schutte | 210—223 X |
| 2,937,752 | 5/1960 | Deschere | 210—193 X |
| 2,973,096 | 2/1961 | Granes | 210—65 |

SAMIH N. ZAHARNA, *Primary Examiner.*